US011866172B2

(12) United States Patent
Mayer et al.

(10) Patent No.: US 11,866,172 B2
(45) Date of Patent: Jan. 9, 2024

(54) FLOW BODY FOR A VEHICLE AND METHOD FOR MANUFACTURING A FLOW BODY

(71) Applicant: Airbus Defence and Space GmbH, Taufkirchen (DE)

(72) Inventors: Florian Mayer, Taufkirchen (DE); Alexander Kolb, Taufkirchen (DE); Simone Mancini, Taufkirchen (DE)

(73) Assignee: Airbus Defence and Space GmbH

( * ) Notice: Subject to any disclaimer, the term of this patent is extended or adjusted under 35 U.S.C. 154(b) by 74 days.

(21) Appl. No.: 17/511,817

(22) Filed: Oct. 27, 2021

(65) Prior Publication Data

US 2022/0212794 A1 Jul. 7, 2022

(30) Foreign Application Priority Data

Oct. 28, 2020 (DE) .................. 10 2020 128 400.4

(51) Int. Cl.
  *B64D 1/06* (2006.01)
  *B64C 23/00* (2006.01)
  *B33Y 80/00* (2015.01)

(52) U.S. Cl.
  CPC .............. *B64D 1/06* (2013.01); *B64C 23/005* (2013.01); *B33Y 80/00* (2014.12); *B64C 2230/14* (2013.01); *B64C 2230/22* (2013.01)

(58) Field of Classification Search
  CPC ........................... B64C 23/005; B64C 1/0009
  See application file for complete search history.

(56) References Cited

U.S. PATENT DOCUMENTS

| 2,451,479 A | 10/1948 | Diehl | |
| 2,749,064 A * | 6/1956 | Kuhlman, Jr. | ............ B64D 1/06 |
| | | | 89/1.51 |

(Continued)

FOREIGN PATENT DOCUMENTS

| CN | 108482641 A | 9/2018 |
| EP | 2069625 A2 | 6/2009 |

(Continued)

OTHER PUBLICATIONS

Buell Donald A: "An Experimental Investigation of the Airflow Over a Cavity With Antiresonance Devices", Mar. 31, 1971 (Mar. 31, 1971), XPOSS89417S, Retrieved from the Internet: URL: https://ntrs.nasa.gov/api/citations/19 710008402/downloads/19710008402.pdf [retrieved on Feb. 22, 2022] pp. 1-18 * figures 1-19 *. 74 pgs.

(Continued)

*Primary Examiner* — Christopher P Ellis
(74) *Attorney, Agent, or Firm* — Lerner David LLP

(57) ABSTRACT

A flow body for an aircraft includes a recess in a surface of the flow body, a first structural component with a porous material and may also include a second structural component with a porous material. The recess includes a front recess region and a rear recess region. The first structural component is arranged in, or on, the front recess region and the second structural component may be arranged in, or on, the rear recess region. An aircraft having the flow body, a weapons system having the flow body and a method for manufacturing a flow body for a vehicle are also described.

9 Claims, 4 Drawing Sheets

(56) References Cited

U.S. PATENT DOCUMENTS

| | | | |
|---|---|---|---|
| 4,697,764 A * | 10/1987 | Hardy | B64D 1/06 89/1.51 |
| 2010/0038476 A1 | 2/2010 | Gantie et al. | |
| 2021/0039773 A1* | 2/2021 | Hirai | B64C 7/00 |

FOREIGN PATENT DOCUMENTS

| | | |
|---|---|---|
| JP | 2008136332 A | 6/2008 |
| WO | 2019163379 A1 | 8/2019 |

OTHER PUBLICATIONS

Search Report for European Application No. 21204400.2 dated Mar. 3, 2022. 2 pgs.

\* cited by examiner

FLOW BODY FOR A VEHICLE AND METHOD FOR MANUFACTURING A FLOW BODY

FIELD OF THE INVENTION

The present invention relates to influencing the acoustic properties of flow bodies. In particular, the present invention relates to a flow body for a vehicle, an aircraft having a flow body, a weapons system having a flow body, and a method for manufacturing a flow body.

BACKGROUND OF THE INVENTION

Flow bodies of vehicles usually have defined geometric properties which allow a given function to be performed. For example, a wing profile of an aircraft may have a slightly curved cross section, which produces lift when there is an oncoming flow and, at the same time, is designed to keep air resistance to a minimum. In particular, the flow bodies provided on aircraft are usually designed in such a manner that the air resistance of the aircraft is as low as possible during operation, in order to save fuel. In addition, however, it may also be desirable for the acoustic properties of vehicles or aircraft to be improved. This means that with some applications, the important thing is for noise generation when a fluid, such as air, flows against the flow body to be kept as low as possible. Noise generation is usually increased where there are unevennesses on the surface of a flow body, such as depressions or projections.

US 2010/0038476 A1 and EP 2069625 EP describe a device for improving the effectiveness of the acoustic treatment in an aircraft power drive unit. The device is intended to reduce the sound of the drive unit as perceived on the ground. The device comprises a pipe into which a flow of gas flows, wherein the pipe is limited by two roughly concentric inner walls and outer walls. The device comprises at least one partition wall which extends over at least one portion of the length of the pipe between the inner walls and the outer walls. The profile of at least one wall of the at least one partition wall is defined in such a manner that the number of reflections of a sound ray on the inner wall or outer wall varies.

BRIEF SUMMARY OF THE INVENTION

The problem addressed by aspects of the present invention is that of improving the acoustic properties of flow bodies.

According to one aspect of the invention, a flow body for a vehicle is specified. The flow body comprises a recess, which is provided in the form of a depression in a surface of the flow body. The recess extends along a main flow direction, which is defined by a flow direction of a fluid, such as air, for example, flowing over the surface of the flow body. The flow body comprises a first structural component with a porous material and may comprise, in addition, a second structural component with a porous material. The recess comprises a front recess region and a rear recess region, wherein the front recess region is arranged upstream of the rear recess region in the main flow direction. The first structural component is arranged in, or on, the front recess region. Alternatively, it may be provided that the first structural component is arranged in, or behind, the recess region.

In one example, the first structural component is arranged in, or on, the front recess region, and a second structural component is arranged in, or on, the rear recess region. This exemplary case is explained in even greater detail below.

With a flow body of this kind, it is possible to improve the acoustic properties when the flow body has an oncoming flow. In particular, the specific arrangement of the porously structured structural element, or of the porously structured structural elements, can cause a noise reduction to be achieved in the region of the recess in the flow body.

In other words, the one, or the multiple, structural components are positioned in the front region and/or in the rear region of the recess, in relation to the flow direction of the fluid flowing over the surface of the flow body. In this way, the oncoming fluid flow can be influenced in the vicinity of the front region of the recess with the first structural component as if by a spoiler, wherein the boundary layer is extended over the recess and the acoustic energy which thereby occurs is absorbed, when eddy flows of the fluid encounter the rear region of the recess, which may comprise a second structural component. From a physical point of view, two main phenomena occur, namely viscous diffusion of the flow within the boundary layer and acoustic absorption within the porous material of the structural elements.

Another aspect that should not be overlooked in this case is also the reduction in mechanical loads on the equipment and components within the recess that is achieved by the flow body according to an embodiment of the invention. In other words, the arrangement of the porous structural components relative to the recess in the flow body means that a flow within the recess has less effect on the components located therein, so that these components are exposed to less severe mechanical loads due to the flow within the recess. Ultimately, this results in a longer service life for the components within the recess and reduced maintenance costs and improved usability of the flow body, and therefore improved usability of the vehicle which includes the flow body.

The flow body according to an embodiment of the invention can be applied and used wherever shear layers occurring in the fluid produce pressure fluctuations or noise. Examples of this are to be found in aviation, landing gear wells, landing gear, pantographs or movable wing leading edges. In the automobile industry, the flow body according to the invention can be used in sun roofs or wing mirrors.

The flow body may be a component of a vehicle, in particular an aircraft, a ground vehicle or a watercraft. Accordingly, the fluid which flows over the surface of the flow body is preferably air or water.

As mentioned, recesses in the form of depressions in flow surfaces of flow bodies usually influence the boundary layer of the flow, which can, among other things, lead to turbulence and pressure fluctuations that have a negative impact on the acoustic properties. The specific arrangement and configuration of the structural components in the front and/or rear recess region cause the acoustic properties of the entire flow body to be improved, in that the noise generation due to any turbulence in the region of the recess is substantially reduced. In some applications, it may be crucially important to reduce the noise which results from the fluidic properties of a vehicle.

The flow body may be characterized in that the fluid, for example air, flows over its surface. The surface can therefore form an outer skin, or an outer contour, of the vehicle. The recess is a depression in the surface of the flow body. The depression may therefore be an indentation, a dip, a notch, a trough, a groove, a cavity, or the like, in the surface of the flow body. In some applications, the depression may be a weapons bay of an aircraft, as is explained in even greater detail below.

The fluid flowing over the surface of the flow body has a main flow direction in relation to the flow body, which defines the flow direction of the fluid over the surface of the flow body when said body is used, or operated, in the correct way. The main flow direction can run substantially parallel to the surface of the flow body. In other words, the fluid flows along the surface of the flow body.

The first structural component may be arranged in the front recess region of the depression, which means that the first structural component is recessed at least partially in the depression and fills it at least in part. Alternatively, the first structural component may also be arranged only at the front recess region, which may mean that the first structural component is fitted to the surface of the flow body, this being adjacent to the front recess region, however. In the latter case, no portion of the first structural component is situated within the recess.

Alternatively, the first structural component may be arranged in the rear recess region of the depression, which means that the first structural component is recessed at least partially in the depression and fills it at least in part. Alternatively, the first structural component may also be arranged only at the rear recess region, which may mean that the first structural component is fitted to the surface of the flow body, this being adjacent to the rear recess region, however. Once again, no portion of the first structural component is situated within the recess in the latter case.

One exemplary case in which the first structural component is arranged in, or on, the front recess region, and a second structural component is arranged in, or on, the rear recess region, is explained in greater detail below and described in detail in the figure description.

According to a further embodiment, the flow body therefore comprises a second structural component with a porous material, wherein the second structural component is arranged in, or on, the rear recess region. In this case, the first structural component is arranged in, or on, the front recess region, so that the first structural component is arranged spatially separately from the second structural component.

The second structural component may, in addition, be arranged in the rear recess region of the recess, which may mean that the second structural component is recessed at least partially in the depression and fills it at least in part. Alternatively, the second structural component may also be arranged only at the rear recess region, which may mean that the second structural component is fitted to the surface of the flow body, this being adjacent to the rear recess region, however. Once again, no portion of the second structural component is situated within the recess in the latter case.

The two structural components are arranged spatially separately from one another, which may mean that they are embedded as separate bodies, or components, in the recess and are spaced apart from one another at a given distance, so that the recess is only partially filled with the two structural components. The free space lying between the two structural components within the recess may be filled with air and/or other components.

The two structural components may have different geometric appearances. However, the structural properties may be the same, or at least, similar. This means that the two structural components comprise the same porous material. The porous material may comprise a foam-like or sponge-like structure. The porous material may take the shape of a porous microstructure, for example. The structure and the manufacture of the two structural components are explained in even greater detail below.

According to one embodiment, the first structural component has a sponge-like structure with pores and channels, wherein the pores and channels are configured to allow a first part of the fluid flowing over the surface of the flow body to flow through the first structural component.

It is possible for a part of the fluid flowing over the surface of the flow body to encounter the first structural component, for example because said structural component projects from the surface plane. The oncoming fluid then encounters the first structural component, as a result of which a first part of the oncoming fluid is allowed through on account of the porous structure of the first structural component, wherein the fluid flows through the pores and channels. A second part of the oncoming fluid in this case is deflected from the second structural component and flows past it to the side, or over the second structural component.

The porous structure may be an open structure, so that the pores and channels contained therein are connected fluidically to the environment via openings on the surface of the structural components. In this way, the fluid can flow into the porous structure of the two structural components and therefore through the pores and channels situated therein.

According to a further embodiment, the first structural component comprises a metallic material. In addition, or alternatively, the second structural component comprises a metallic material.

The metallic material may be present in the form of a hardened metal foam. During production of the first and second porous structural components, metal foam can therefore be foamed or printed on. The metallic material may contain an aluminium/silicon alloy. By way of example, the first or second structural component can be printed by means of a metal powder which contains an aluminium alloy AlSi10Mg. This material guarantees good mechanical resistance with simultaneous provision of the noise-reduction function described above. However, other materials, such as plastics etc., for example, are also possible. The material to be used may be independent of the area of application and the anticipated loads on the flow body.

In accordance with a further embodiment, the first structural component is introduced into the front recess region by means of a three-dimensional printing process. In addition, or alternatively, the second structural component is introduced into the rear recess region by means of a three-dimensional printing process.

The three-dimensional printing process, for example additive layer manufacturing (ALM), can print, as it were, the porous structure of the first and second structural component on the flow body, or else in, or on, the depression. The three-dimensional printing process may be a three-dimensional metal printing process. The first structural component and/or the second structural component can be produced integrally with the flow body, giving rise to a one-piece structure with the two structural components and the other components of the flow body. However, it may be provided that the first and/or the second structural component are manufactured as separate components and fastened in, or on, the recess of the flow body. The fastening in this case may involve bonding, welding, screwing, riveting, etc. The first and/or the second structural component may be a perforated steel sheet, for example.

The porous structure may have a random design. In particular, the sponge-like or foam-like structure of the porous material of the first and second structural component may have an irregular shape. This irregular shape may give the appearance of a series of branches, a network, a mesh, a sponge or a foam.

According to a further embodiment, the first structural component comprises a flow-influencing portion which projects from the surface of the flow body.

In this way, an overhang or protrusion can be supplied by the first structural component, which rises up at least in part from the surface of the flow body, so that a first part of the oncoming fluid can flow through the first structural component, on account of its porous design, and a second part of the oncoming fluid is deflected by the first structural component. The flow-influencing portion of the first structural component in this case acts like a spoiler on the surface of the flow body which deflects the oncoming fluid, so that the boundary layer downstream of the first structural component, in other words over the depression, can be influenced.

According to a further embodiment, the flow-influencing portion of the first structural component exhibits a wedge shape.

The wedge shape in this case can be oriented in such a manner in respect of the surface of the flow body, that the oncoming fluid is deflected at a deflection angle created by the wedge angle of the wedge. This will become even more apparent in the description of the figures.

It is possible, however, for other forms of the flow-influencing portion to be provided instead of a wedge shape. These may be plate-like, rectangular, semi-spherical, cylindrical or other flow-influencing sectional shapes which project from the surface of the flow body.

According to a further embodiment, the second structural component has a cuboid form and is arranged in the rear recess region in such a manner that the second structural component terminates flush with the surface of the flow body.

In this case, the second structural component is therefore arranged in such a manner that it does not project from the recess beyond the surface of the flow body. Consequently, it is possible for a certain fraction of the fluid to encounter the second structural component across, or within, the recess, wherein a first part of this fraction also flows through the second structural component, on account of its porous material, and a second part is deflected by the second structural component.

Finally, the arrangement and form of the first structural component and the second structural component mean that the noise generation, which occurs due to the interaction of the flowing fluid with components of the flow body, is substantially reduced.

According to a further embodiment, the recess is provided in the form of a substantially cuboid material recess in the flow body, wherein the recess has a base area spaced apart from the surface of the flow body.

The recess may be a bay embedded in the surface of the flow body, which extends up to the base area. The recess may therefore be suitable for accommodating an element or a device, which is arranged in the recess such that it can be moved or removed, for example. The base area of the recess may be connected to the surface via four side walls arranged perpendicularly relative to the surface of the flow body. In this case, the first and second structural components abut two opposite side walls of the recess, namely a front wall or a rear wall of the recess.

According to a further embodiment, the first structural component is spaced apart from the base area of the recess over a predefined distance. Alternatively, or in addition, the second structural component is spaced apart from the base area of the recess over a predefined distance.

This means that the first and/or second structural component need not extend over the entire depth of the recess, but may only be configured in the region of the surface. In particular, a noise reduction may be sufficient for the purpose intended here, if the porous material of the two structural components is only located in the region of the surface and only projects a few millimetres or centimetres into the depression of the recess.

According to one aspect of the invention, an aircraft with a flow body, as described earlier and below, is described. The aircraft may be a passenger aircraft, a transport aircraft, a military aircraft, a manned aircraft, an unmanned aircraft, a drone or a helicopter.

A weapons system is specified according to one aspect of the invention. The weapons system comprises a flow body, as described previously and in the following. The recess in this case forms a weapons bay for accommodating a weapon element. The weapons system also comprises a fastening unit for fastening the weapon element within the recess, wherein the fastening unit is designed to convey the weapon element out of the recess in the flow body.

A method for manufacturing a flow body for a vehicle is specified according to one aspect of the invention. In one step of the method, a recess is provided in the shape of a depression in a surface of the flow body, so that the recess extends along a main flow direction which is defined by a flow direction of a fluid flowing over the surface of the flow body. The main flow direction in this case may be the flow direction of the fluid relative to the flow body when the flow body is subsequently used correctly. In a further step, a front recess region and a rear recess region are provided, wherein the front receiving region is arranged upstream of the rear recess region in the main flow direction. In a further step, a first structural component with a porous material is arranged in, or on, the front recess region. Alternatively, however, the first structural component can also be arranged in, or on, the recess region.

In a further step, a second structural component with a porous material can be arranged in the rear recess region, wherein in this case the first structural component is arranged in the front recess region, so that the first structural component is arranged to be spatially separate from the second structural component. The first structural component and/or the second structural component are manufactured by means of a three-dimensional printing process.

DETAILED DESCRIPTION

The depictions in the figures are schematic and are not to scale. If the same reference signs are used in different figures in the following description of the figures, they denote the same, or similar, elements. However, the same, or similar, elements can also be denoted by different reference signs.

Figure 1:
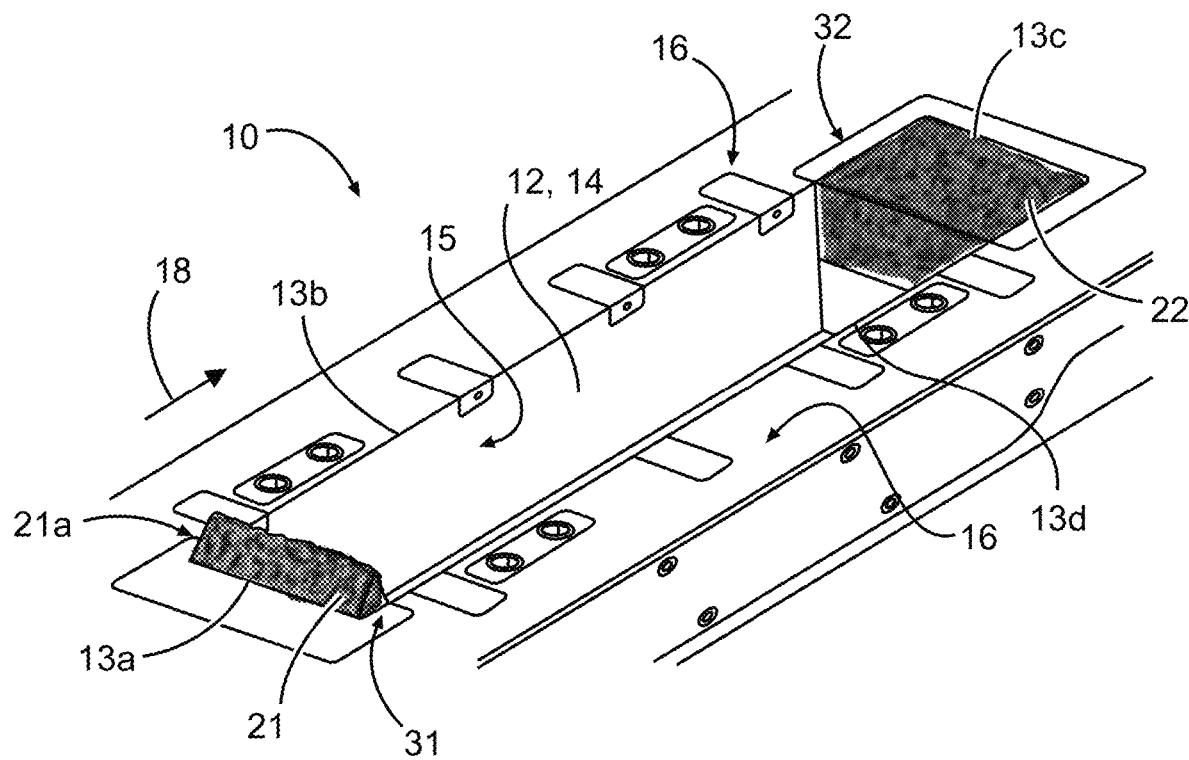
FIG. 1 shows a perspective view of a flow body according to an exemplary embodiment.
Figure 7:
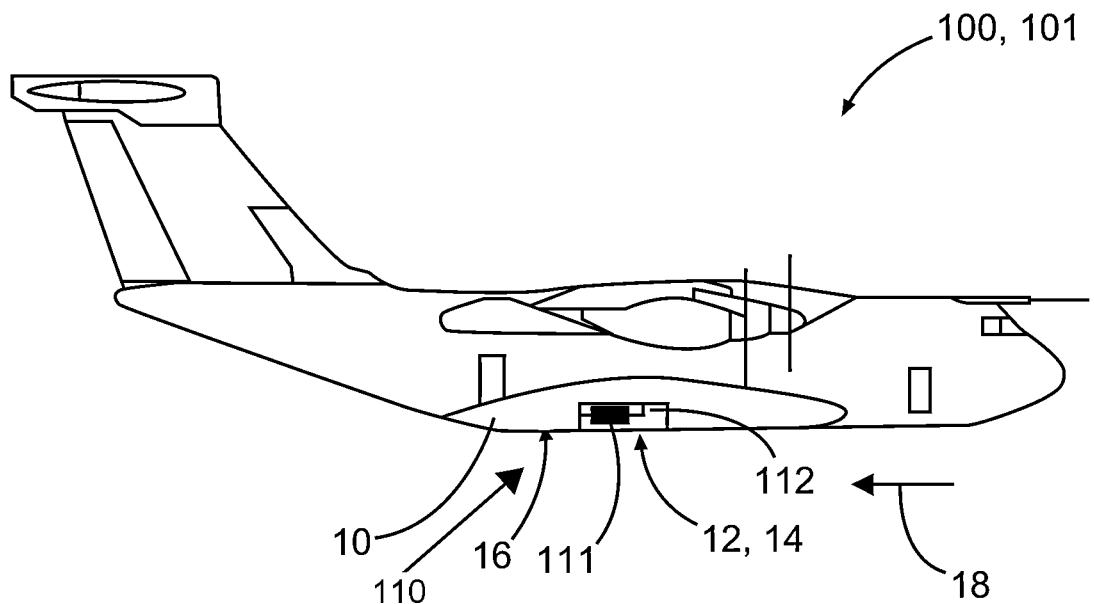
FIG. 7 shows an aircraft with a flow body from FIG. 1 according to an exemplary embodiment.

FIG. 1 shows a perspective view of a flow body 10. The flow body 10 may be a component of a vehicle 100, in particular an aircraft 101, as explained later with reference to FIG. 7. The flow body 10 comprises a recess 12 which is provided in the form of a depression 14 in a surface 16 of the flow body 10. The recess 12 has an elongate design and extends along, or parallel to, a main flow direction 18 denoted by an arrow, which is defined by a flow direction of a fluid flowing over the surface 16 of the flow body 10. The surface 16 may be configured in the form of a substantially planar area which extends about the depression. The surface 16 may be a skin of the aircraft 101, as depicted in FIG. 7. In the case depicted in FIG. 1, the depression 14 has a substantially cuboid form. A side wall 15 of the depression 14 can be seen, which is oriented perpendicularly to the surface 16. The recess 12 or depression 14 is defined by the edges 13a, 13b, 13c, 13d which form the transition from the surface 16 to the respective side walls of the recess 12 or depression 14.

The flow body 10 comprises a first structural component 21 with a porous material, and also a second structural component 22 with a porous material. As can be seen in FIG. 1, the first structural component 21 is arranged in a front recess region 31 of the recess 12, and the second structural component 22 is arranged in a rear recess region 32 of the recess 12. The orientation of the recess 12 may be such that the front recess region 31 is arranged upstream of the rear recess region 32 in relation to the main flow direction 18, which means that when the flow body 10 is correctly used, the fluid flows against, or over, the front recess region 31, before the rear recess region 32 in terms of time. In this way, fluid also flows against the first structural component 21 before the second structural component 21 in terms of time.

An example of a correct use of the flow body 10 may exist if the flow body 10 is integrated in an aircraft and the aircraft moves through the surrounding fluid, so that a flow of fluid is created over the surface 16 of the flow body 10, or the fluid flows against, or over, the first and second structural components.

It can further be seen in FIG. 1 that the first structural component 21 is only arranged partially in the front recess region 31, and another part 21a of the first structural component 21, which is also referred to as a flow-influencing portion 21a, is located outside the recess 12. In other words, the flow-influencing portion 21a projects from the plane of the surface 16 and deflects the oncoming fluid in this region at least partially. The flow-influencing portion 21a in this example has a wedge-shaped design, so that the flow-influencing portion 21a projects increasingly far from the surface 16 in the main flow direction 18. It is understood, however, that other geometries of the flow-influencing portion 21a are possible. The first structural component 21 is therefore located partially, for example with a cuboid portion, within the recess 12 and partially, in other words with the flow-influencing portion 21a, outside the recess 12.

It can likewise be seen that the second structural component 22 is completely arranged in the rear recess region 32, so that the second structural component 22 does not extend from the recess 12 or depression 14 beyond the plane of the surface 16. However, the second structural component 22 is arranged in the recess 12 in such a manner that it is spaced apart from the first structural component 21 over a predefined distance, and a third recess region between the first recess region 31 and the second recess region 32 is filled with fluid or another component is located in the third recess region. The second structural component 22 has a cuboid shape and is arranged in the rear recess region 32 in such a manner that the second structural component 22 terminates flush with the surface 16 of the flow body 10. It is also possible, however, for the second structural component 22 to project from the recess 12 beyond the surface 16.

Figure 2:
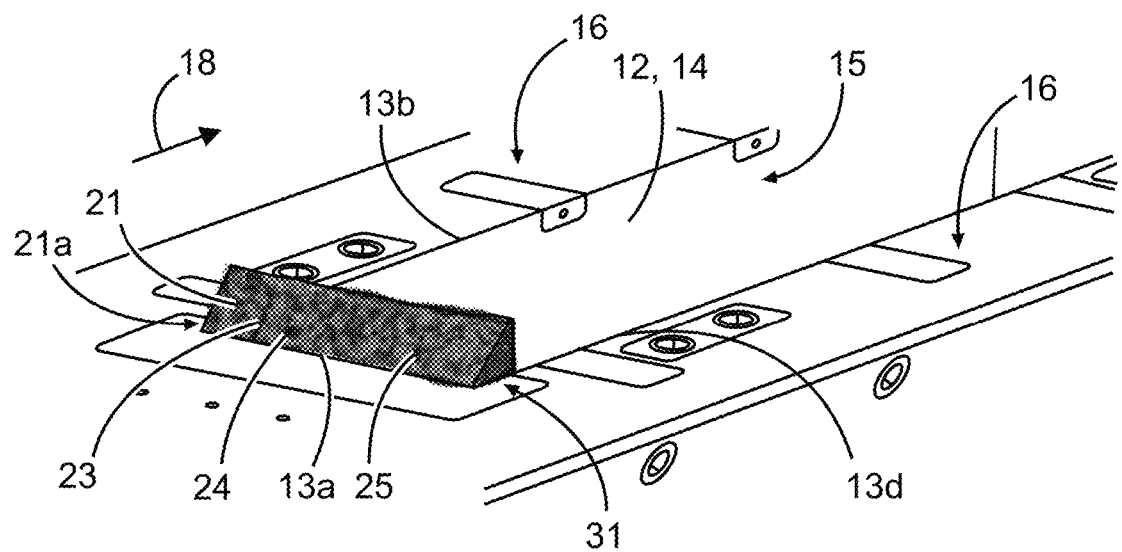
FIG. 2 shows an enlarged perspective view of a first structural component of the flow body from FIG. 1 according to an exemplary embodiment.

FIG. 2 shows an enlarged perspective view of the first structural component 21 of the flow body 10 from FIG. 1. The first structural component 21 has a sponge-like structure with pores 23 and channels 24 which preferably extend over the entire extent of the first structural component 21. In particular, the pores 23 and channels 24 are designed to allow a first part of the fluid flowing over the surface 16 of the flow body 10 to flow through the first structural component 21. FIG. 2 very clearly shows the flow-influencing portion 21a, which projects from the recess 12 as a wedge. The first structural component 21 on the front wall of the recess 12 is therefore also referred to as a spoiler. The spoiler height in this case defines the height at which the flow-influencing portion 21a of the first structural component 21 projects beyond the surface 16. In one example, the ratio of spoiler height to the length of the recess 12 along the main flow direction 18 is roughly ½₀. The first structural component 21 is produced from a metallic material 25.

Figure 3:
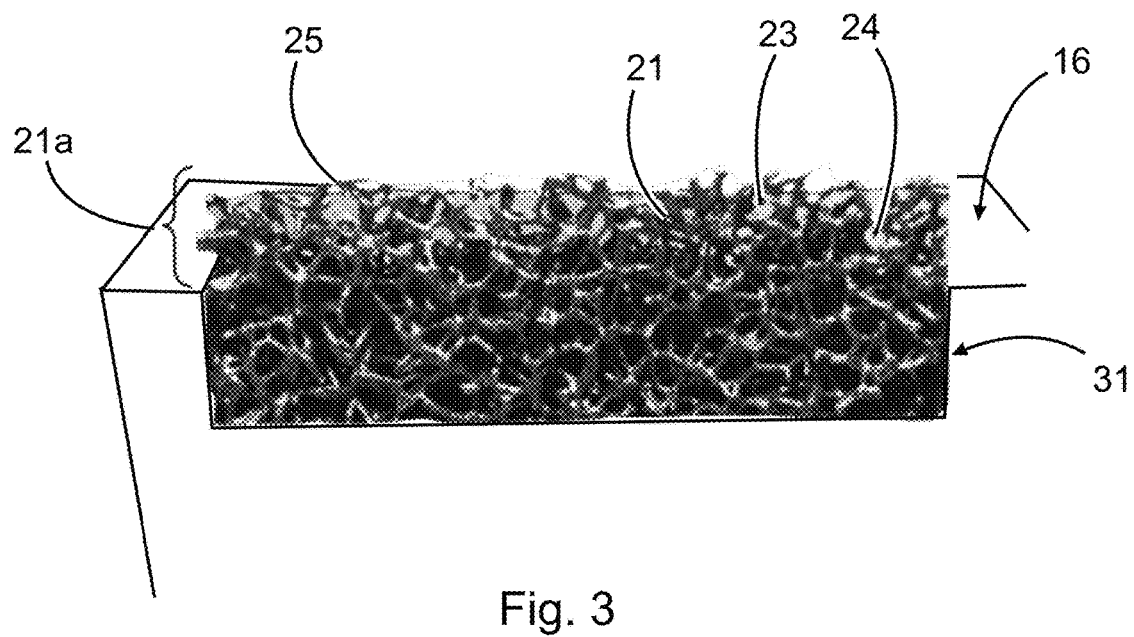
FIG. 3 shows a rear view of the first structural component of the flow body from FIG. 2 according to an exemplary embodiment.

FIG. 3 shows a cross-sectional view through the flow body 10 and, in particular, through the first structural component 21 of the flow body 10. The viewing direction in this case is against the main flow direction 18 of the fluid. In other words, it is a rear view of the first structural component 21. It can be recognized that the first structural component 21 is formed by a plurality of small pores 23 and channels 24. For example, the first structural component 21 is a series of branches or network or a foam-like or sponge-like structure, which is pervaded by pores 23 and channels 24. The first structural component 21 can be produced by means of a three-dimensional printing process, in particular a three-dimensional metal printing process. As can likewise clearly be seen in FIG. 3, the first structural component 21 is partially located within the recess 12 and partially, in other words with the flow-influencing portion 21a, outside the recess 12.

Figure 4:
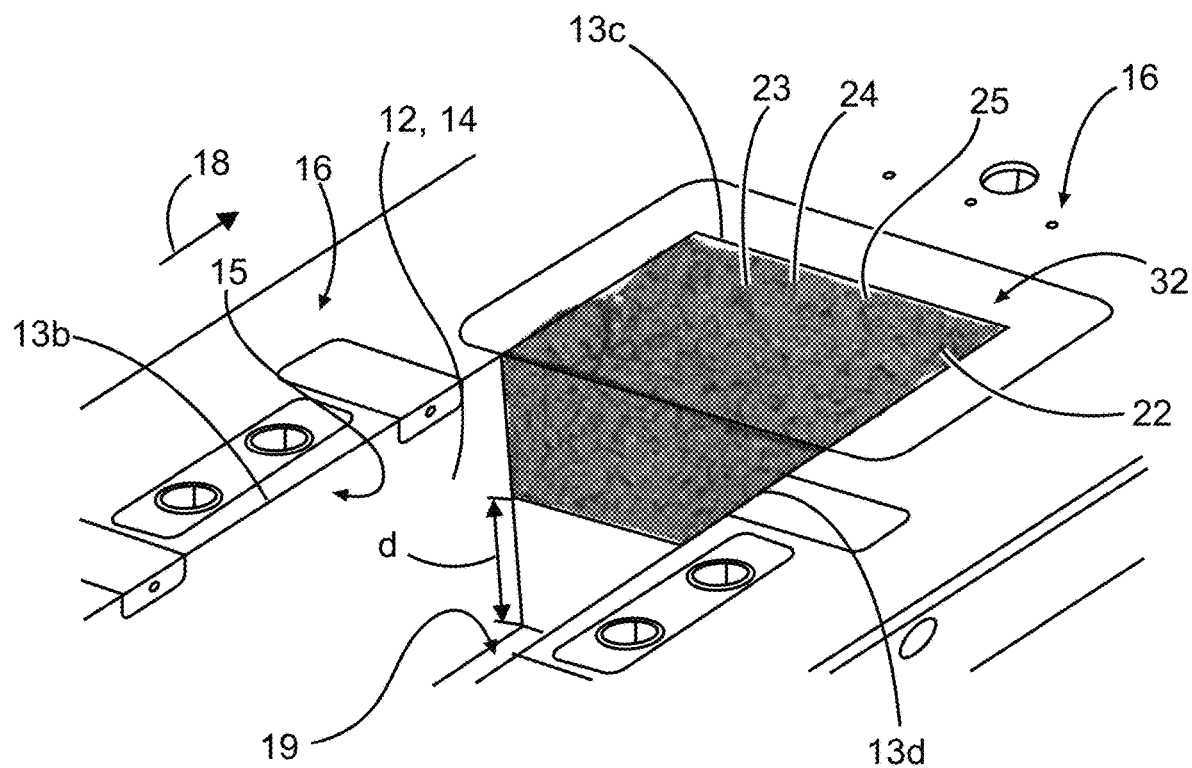
FIG. 4 shows an enlarged perspective view of a second structural component of the flow body from FIG. 1 according to an exemplary embodiment.

FIG. 4 shows an enlarged perspective view of the second structural component 22 of the flow body 10 from FIG. 1. The second structural component 22 likewise has a sponge-like structure with pores 23 and channels 24, which preferably extends over the entire extent of the second structural component 22. In particular, the pores 23 and channels 24 are designed to allow part of the fluid flowing over the surface 16, and/or through the recess 12, to flow through the second structural component 22. FIG. 4 very clearly shows the cuboid shape of the second structural component 22, wherein the second structural component 22 does not project beyond the planar surface 16, but terminates flush therewith, or is aligned therewith. The second structural component 22 is likewise produced from a metallic material 25. The second structural component 22 in the example shown here does not extend up to the base area 19 of the recess 12. In particular, a lower edge, or a lower limiting area, of the second structural component 22 is spaced apart from the base area 19, or a base of the recess 12, by a predefined distance (d). Although it is not depicted, this may otherwise also apply to the first structural component 21, whereof the lower edge, or lower bounding surface, may likewise extend not quite as far as the base area 19. The depth of the recess 12 is defined by the distance between the surface 16 and the base area 19 of the recess 12. A rear wall depth is defined as the depth of the recess 12 between the surface 16 and the base area 19 in the region of the second structural component 22. In one example, the ratio of the rear wall depth to the length of the recess 12 along the main flow direction 18 may be roughly 1/10.

Figure 5:
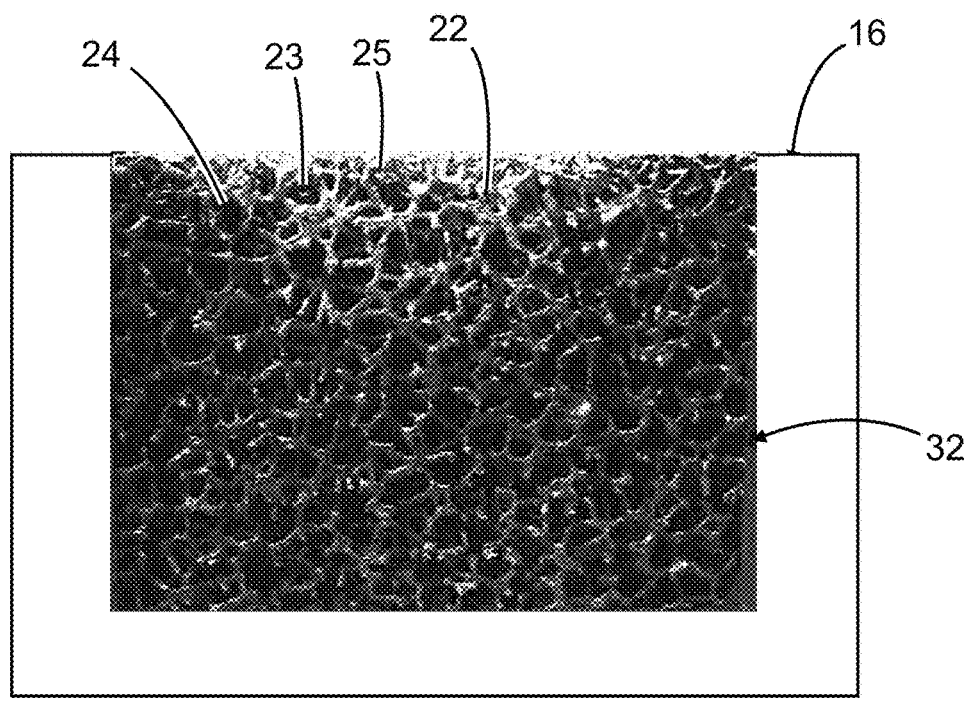
FIG. 5 shows a plan view of the second structural component of the flow body from FIG. 4 according to an exemplary embodiment.

FIG. 5 shows a cross-sectional view through the main body 10 and, in particular, through the second structural component 22 of the flow body 10. The viewing direction is perpendicular to the main flow direction 18 of the fluid, in other words, it is a plan view of the second structural component 22. It is conceivable that the second structural component 22 is formed by a plurality of small pores 23 and channels 24. For example, the second structural component 22 is a series of branches or a network or a foam-like or sponge-like structure which is pervaded by pores 23 and channels 24. The second structural component 22, as well as the first structural component 21 too, can be produced by means of a three-dimensional printing process, in particular a three-dimensional metal printing process. As can likewise be clearly seen in FIG. 5, the second structural component 22 is located entirely within the recess 12 and does not project therefrom.

Figure 6:
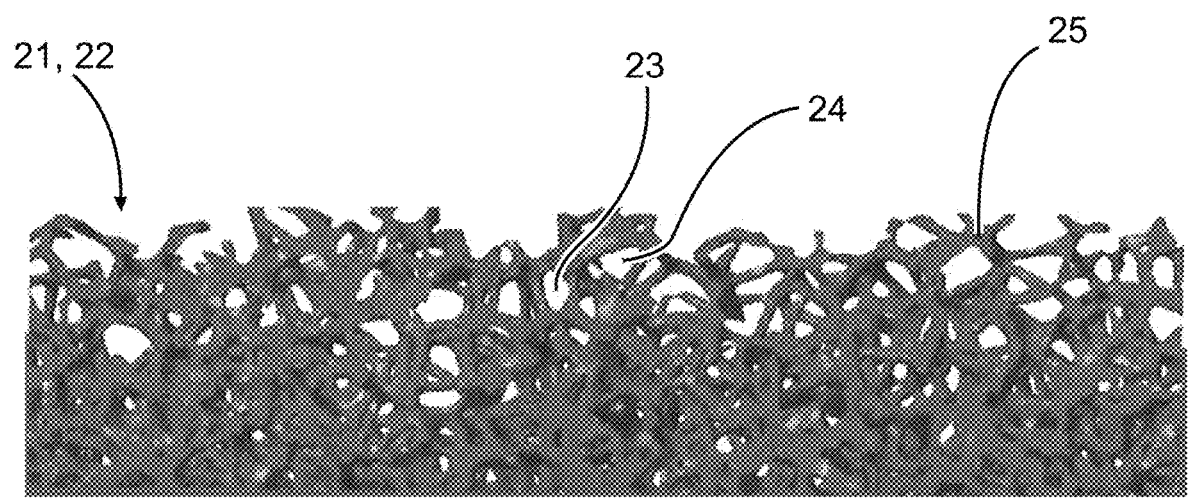
FIG. 6 shows an enlarged depiction of a porous material according to an exemplary embodiment.

FIG. 6 shows an enlarged depiction of the porous material of the first structural component 21 and of the second structural component 22. The network or series of branches made of metallic material 25, which pervades the first structural component 21 and the second structural component 22 can clearly be seen. The result is a porous microstructure. This sponge-like or foam-like microstructure has an irregular design and therefore an arbitrary structure. The porosity, in other words the ratio of the cavity volume (pores 23 and channels 24) to the total volume of the respective structural component 21, 22, may fall in the range of 50% to 95%. The pore size may lie in the micrometre range, in the millimetre range and/or in the centimetre range. The structure is gradually built up during three-dimensional printing and then cured, so that the metal structure shown is formed.

The features and properties of the flow body 10 according to the invention, which are described with reference to FIGS. 1 to 6, result in a configuration in which the oncoming flow can be influenced in such a manner that high pressure fluctuations which occur, also including cavity modes, Rossiter modes or shear layer instabilities, are mitigated or completely avoided. Pressure fluctuations or fluidic-acoustic resonance phenomena can also be perceived as noise. The porous structure of the first structural component 21 and of the second structural component 22 leads to an irregular energy exchange in the region of the shear layer formation along the speed gradients within the flowing fluid. The shear layer is widened. This stabilizes the flow shear layer and shear layer instabilities. The front wall modification, in other words the manipulation of the flowing fluid which takes place at the first structural component 21, also influences in this case the position of the shear layer emanating from it, which, having thereby been reduced, interacts with the rear wall, in other words the second structural component 22, and breaks the chain of the resonance phenomenon. The spanwise irregularity also disturbs the coherent structures lying transversely to the shear layer.

The shape of the front microstructure, in other words, the porous structure of the first structural component 21, may be triangular in cross section or have a wedge shape, but it is not restricted to this shape. Plate-shaped, rectangular, semi-spherical, cylindrical or other flow-influencing portions 21a (cf. FIGS. 1 to 3) are also conceivable. The first structural component 21 with the porous material is placed in the region of the front edge 13a of the recess 12.

The fastening of the porous structural components 21, 22 in the recess 12 may have an integral design, as shown in FIGS. 3 and 5. However, fastenings adhered, or screwed, to a support structure or a movable mechanism are also possible. The fastening may vary, depending on the design of the recess 12, the total geometry of the flow body 10, or the area of application. In particular, the kind of fastening of the structural components 21, 22 in the recess 12 can be adapted according to the longitudinal section of the recess 12. The two structural components 21, 22 may extend as far as the base, in other words, as far as the base area 19 of the recess 12, but this is not necessary. It is likewise possible for the density or the porosity within the first structural component 21 and/or the second structural component 22 to be variable in design.

The porous structures of the first and second structural component 21, 22 are preferably randomly distributed and asymmetrical. The ratio of structural material to cavity defines the porosity or also the ease of passage. They are not set at firmly defined variables and can be scaled for the respective application. For example, the ratio of a web thickness or web width of the structural material to a pore size in the material of the structural components may vary. The dimensions of the structural components 21, 22 may fall within the millimetre range. However, specific applications are also possible in which dimensions of the structural components 21, 22 preferably lie within the millimetre range. For example, the structural components 21, 22 may have dimensions of several metres. Particularly in the specific application of a weapons bay, as described below with reference to FIG. 7, the width of the structural components 21, 22 may also amount to more than one metre.

FIG. 7 shows a vehicle 100 or an aircraft 101 with the flow body 10 from FIG. 1. The aircraft 101 may be a military platform in which the flow body 10 is used. In particular, the aircraft 101 has a weapons system 110 which comprises the flow body 10. The recess 12 in this case creates a weapons bay for receiving a weapon element 111. The weapon element 111 is fastened by a fastening unit 112 within the recess 12, so that the weapon element 111 can be transported out of the recess 12 of the flow body 10. The flow body 10, in particular the arrangement and the porous form of the structural component 21 as described, and the second structural component 22 may bring about a substantial noise reduction in this case during interaction with the fluid flowing past or flowing over the flow body 10.

Figure 8:
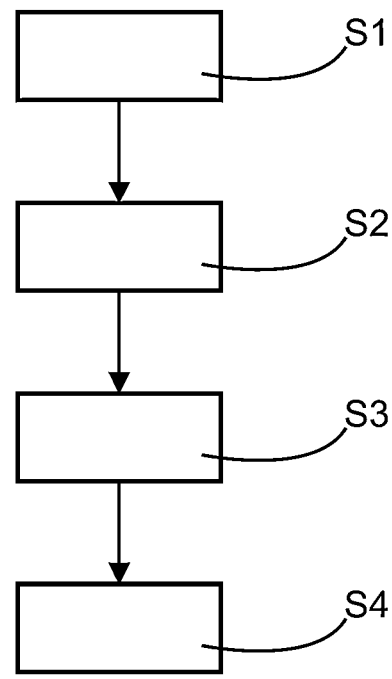
FIG. 8 shows a flow chart for a method of manufacturing a flow body according to an exemplary embodiment.

FIG. 8 shows a flow diagram for a method for producing a flow body 10 for a vehicle 100. In a step S1 of the method, a recess 12 in the form of a depression 14 in a surface 16 of the flow body 10 is provided, wherein the recess 12 extends along a main flow direction 18 which is defined by a flow direction of a fluid flowing over the surface 16 of the flow body 10. In a further step S2, a front recess region 31 and a rear recess region 32 are supplied, wherein the front recess region 31 is arranged upstream of the rear recess region 32 in the main flow direction 18. In a further step S3, a first structural component 21 is arranged with a porous material in the front recess region 31. In a further step S4, a second structural component 22 with a porous material is arranged in the rear recess region 32, so that the first structural component 21 is arranged spatially separate from the second structural component 22. The first structural component 21 and/or the second structural component 22 are produced by means of a three-dimensional printing process.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flow body for a vehicle, comprising:
a recess provided in the form of a depression in a surface (16) of the flow body;
wherein the recess extends along a main flow direction, the main flow direction defined by a flow direction of a fluid flowing over the surface of the flow body;
wherein the recess comprises a front recess region and a rear recess region, wherein the front recess region is arranged upstream of the rear recess region in the main flow direction;
a first structural component with a porous material;
wherein the first structural component is arranged in, or on, the front recess region;
a second structural component with a porous material;
wherein the second structural component is arranged in, or on, the rear recess region;
wherein the first structural component is arranged spatially separately from the second structural component;
wherein the first structural component has pores and channels;
wherein the pores and channels are configured to allow a first part of the fluid flowing over the surface of the flow body to flow through the first structural component;
wherein the first structural component comprises a flow-influencing portion projecting from the surface of the flow body;
wherein the flow-influencing portion of the first structural component exhibits a wedge shape;
wherein the pores and channels of the first structural component extend over the entire extent of the first structural component along the main flow direction.

2. The flow body according to claim 1,
wherein the first structural component comprises a metallic material.

3. The flow body according to claim 1,
wherein the first structural component is introduced into the front recess region.

4. The flow body according to claim 1,
wherein the second structural component exhibits a cuboid shape and is arranged in the rear recess region in such a manner that the second structural component terminates flush with the surface of the flow body.

5. The flow body according to claim 1,
wherein the recess is provided in the form of a substantially cuboid material recess in the flow body,
wherein the recess has a base area spaced apart from the surface of the flow body.

6. The flow body according to claim 5,
wherein the first structural component is spaced apart from the base area of the recess over a predefined distance.

7. An aircraft comprising a flow body according to claim 1.

8. A weapons system, comprising:
a flow body according to claim 1;
wherein the recess forms a weapons bay for accommodating a weapon element;
a fastening unit for fastening the weapon element within the recess;
wherein the fastening unit is configured to convey the weapon element out of the recess in the flow body.

9. A method for manufacturing a flow body for a vehicle, comprising:
providing a recess in the form of a depression in a surface of the flow body, wherein the recess extends along a main flow direction, wherein the main flow direction is defined by a flow direction of a fluid flowing over the surface of the flow body;
providing a front recess region and a rear recess region, wherein the front recess region is arranged upstream of the rear recess region in the main flow direction;
arranging a first structural component with a porous material in, or on, the front recess region;
wherein the first structural component is manufactured by a three-dimensional printing process;
arranging a second structural component with a porous material in, or on, the rear recess region;
wherein the first structural component is arranged spatially separately from the second structural component;
wherein the first structural component has pores and channels;
wherein the pores and channels are configured to allow a first part of the fluid flowing over the surface of the flow body to flow through the first structural component;
wherein the first structural component comprises a flow-influencing portion projecting from the surface of the flow body;
wherein the flow-influencing portion of the first structural component exhibits a wedge shape; and
wherein the pores and channels of the first structural component extend over the entire extent of the first structural component along the main flow direction.

* * * * *